United States Patent
Li et al.

(10) Patent No.: US 11,907,390 B2
(45) Date of Patent: Feb. 20, 2024

(54) METHOD AND APPARATUS FOR VISUAL CONSTRUCTION OF KNOWLEDGE GRAPH SYSTEM

(71) Applicant: ZHEJIANG LAB, Zhejiang (CN)

(72) Inventors: Jingsong Li, Hangzhou (CN); Guangyuan Deng, Hangzhou (CN); Tianshu Zhou, Hangzhou (CN); Yu Tian, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/336,053

(22) Filed: Jun. 16, 2023

(65) Prior Publication Data
US 2023/0409728 A1 Dec. 21, 2023

(30) Foreign Application Priority Data
Jun. 17, 2022 (CN) .......................... 202210685209.0

(51) Int. Cl.
*H04L 29/06* (2006.01)
*G06F 21/62* (2013.01)
(Continued)

(52) U.S. Cl.
CPC ...... *G06F 21/6218* (2013.01); *G06F 16/9024* (2019.01); *G06F 21/602* (2013.01); *H04L 9/3006* (2013.01)

(58) Field of Classification Search
None
See application file for complete search history.

(56) References Cited

U.S. PATENT DOCUMENTS 9,972,304 B2 * 5/2018 Paulik .................. G10L 15/063
10,223,066 B2 * 3/2019 Martel .................... G10L 15/22
(Continued)

FOREIGN PATENT DOCUMENTS

CN 105868313 A 8/2016
CN 111143479 A 5/2020
(Continued)

OTHER PUBLICATIONS

Chida, Anjum et al. Enhanced Encoding with Improved Fuzzy Decision Tree Testing Using CASP Templates. IEEE Computational Intelligence Magazine, vol. 7, Issue: 4. https://ieeexplore.ieee.org/stamp/stamp.jsp?tp=&arnumber=6331721 (Year: 2012).*
(Continued)

*Primary Examiner* — Jeremiah L Avery
(74) *Attorney, Agent, or Firm* — W&G Law Group (57) ABSTRACT

Discloses a method and an apparatus for visual construction of a knowledge graph system. In the present disclosure, data permission of a distributed client is determined through a central server. The central server obtains a master template of a knowledge graph system and sends it to the distributed client. The distributed client receives a natural language inputted by a user and parses to generate an abstract syntax tree. The user completes customization of a subtemplate of the knowledge graph system through visual operation. The distributed client encrypts the subtemplate and then sends it to the central server. When the knowledge graph system is to be used, any knowledge concept is inputted, the central server calls and decrypts the subtemplate and then searches a database, and a tree structure knowledge graph is generated and sent to the distributed client.

8 Claims, 6 Drawing Sheets

(51) Int. Cl.
   *H04L 9/30*    (2006.01)
   *G06F 21/60*   (2013.01)
   *G06F 16/901*  (2019.01)

(56) References Cited

U.S. PATENT DOCUMENTS

| | | | |
|---|---|---|---|
| 11,100,144 B2 * | 8/2021 | Galitsky | G06N 7/01 |
| 11,558,192 B2 * | 1/2023 | Auh | H04L 9/14 |
| 11,710,482 B2 * | 7/2023 | Garcia | G10L 15/26 |
| | | | 704/275 |
| 2017/0235848 A1 * | 8/2017 | Van Dusen | G06Q 30/0201 |
| | | | 705/12 |
| 2019/0057145 A1 | 2/2019 | Huang et al. | |
| 2019/0158353 A1 * | 5/2019 | Johnson | G06F 16/95 |
| 2021/0350248 A1 | 11/2021 | Rogers et al. | |
| 2022/0222431 A1 * | 7/2022 | Zionpour | G06F 40/114 |
| 2023/0289340 A1 * | 9/2023 | Cella | G06F 16/24537 |
| | | | 707/714 |

FOREIGN PATENT DOCUMENTS

| | | |
|---|---|---|
| CN | 111427901 A | 7/2020 |
| CN | 111667074 A | 9/2020 |
| CN | 111930856 A | 11/2020 |
| CN | 112035667 A | 12/2020 |
| CN | 112102937 A | 12/2020 |
| CN | 112287114 A | 1/2021 |
| CN | 112417172 A | 2/2021 |
| CN | 112579707 A | 3/2021 |
| CN | 112579787 A | 3/2021 |
| CN | 112988950 A | 6/2021 |
| CN | 114491073 A | 5/2022 |
| WO | 2021008180 A1 | 1/2021 |
| WO | 2021164226 A1 | 8/2021 |
| WO | 2021196520 A1 | 10/2021 |
| WO | 2022021958 A1 | 2/2022 |

OTHER PUBLICATIONS

Le, Duc Minh. A Tree-Based, Domain-Oriented Software Architecture for Interactive Object-Oriented Applications. 2015 Seventh International Conference on Knowledge and Systems Engineering (KSE). https://ieeexplore.ieee.org/stamp/stamp.jsp?tp=&arnumber=7371752 (Year: 2015).*

Srinivasan, Sriram et al. A Shared-Memory Algorithm for Updating Tree-Based Properties of Large Dynamic Networks. IEEE Transactions on Big Data, vol. 8, Issue: 2. https://ieeexplore.ieee.org/stamp/stamp.jsp?tp=&arnumber=8464249 (Year: 2022).*

Notice Of Allowance(CN202210685209.0); dated Aug. 18, 2022.
First Office Action(CN202210685209.0); dated Aug. 8, 2022.
Automatical-construction-of-Chinese-knowledge-graph-system, 2016.
Big-data-visualization-technology-and-applications, 2020.
A-Survey-on-Knowledge-Graph-Visualization, Oct. 2019.
Visualization-of-researcher's knowledge-structure-based-on-knowledge-network, Oct. 2009.
EHR-Oriented-Knowledge-System: Toward-Efficient-Utilization-of-Non-Used-Information-Buried-in-Routine-Clinical-Practice, Jul. 2021.

* cited by examiner

METHOD AND APPARATUS FOR VISUAL CONSTRUCTION OF KNOWLEDGE GRAPH SYSTEM

CROSS-REFERENCE TO RELATED APPLICATIONS

The present application claims priority to Chinese Patent Application No. 202210685209.0, filed on Jun. 17, 2022, the content of which is incorporated herein by reference in its entirety.

TECHNICAL FIELD

The present disclosure relates to the technical field of knowledge graphs, in particular to a method and an apparatus for visual construction of a knowledge graph system.

BACKGROUND

A knowledge graph is a modern theory that combines the theories and methods of applied mathematics, graphics, information visualization technology, information science and other disciplines with bibliometric citation analysis and co-occurrence analysis, and uses a visual graph to vividly show the core structure, development history, frontier fields and overall knowledge structure of the discipline to achieve the goal of multi-disciplinary integration. It can provide practical and valuable reference for subject research.

In many disciplines, there is an urgent need for knowledge graph. Therefore, one will create one's own knowledge graph system in your own discipline. The system has the ability to calculate and display its corresponding knowledge graph network structure diagram by searching the concept of entity. For example, in the pharmaceutical discipline, the drug knowledge graph system can show the knowledge graph formed by the sides of the searched drug as the central node, including molecular formula, structural formula, specification components, interaction and mutual contraindications. For another example, in clinical disciplines, patient knowledge graph can show the relationship between patients' demands, medical history and symptoms.

Every time a complete knowledge graph system is developed, not only the back end and the front end need to discuss and determine the interface, field and request mode of network requests, but also the back end needs to clean data in different databases to generate tree data structures; the front end performs data traversal, renders the knowledge graph layer, and finally, a knowledge graph system can be obtained after joint debugging of the front end and the back end is passed.

At present, the development of knowledge graph system is carried out through the above production solution. For example, the solution introduced in the patent with publication number of "CN 112988950 A" is that "after the back end obtains the layer, the front end needs to render the layer, and after rendering, the graphical knowledge graph can be displayed in the front end". However, a lot of research, including this patent, is aimed at optimizing the front end rendering of knowledge graph, without inventing the engineering aspect of the solution. However, the traditional solution has caused a lot of repetitive development to the front and back work, resulting in a waste of more time and cost and network resources.

The patent with publication number of CN 111427901 A proposes an interactive knowledge graph data editing method, which sends the configuration file of the knowledge graph data to be edited to the data middleware through the front end, obtains the knowledge graph data according to the configuration, and then sends the data format that meets the requirements to the front end, and finally presents the knowledge graph. The method of the application realizes local editing of the constructed knowledge graph data, and reduces the maintenance and management costs of the knowledge graph data. However, the problem of repeated development of the front and back ends has not been completely solved, and a layer of data processing middleware has been added at the back end level, which makes the system more complicated.

In addition, the application fields of knowledge graph cover all aspects, such as pharmacology and clinical disciplines mentioned above. The data in these fields have very urgent requirements for their privacy. Therefore, when building a knowledge graph system, there are certain requirements for the privacy protection of the original data and the data permissions that the system can access.

To sum up, the existing technologies have not directly solved the problem of repeated development of the front and back ends. Among them, the repeatability of the back end is that every time a new system is developed, the database in the research field needs to be cleaned to obtain the data model needed by this knowledge graph system. The repeatability of the front end lies in the secondary processing of this set of forms for searching entity concepts and the data sent by the back end.

SUMMARY

In the present disclosure, a large amount of repetitive work caused by the traditional solution is studied, and a visual construction method and a visual construction apparatus of a knowledge graph system are provided, so that knowledge graph systems in various research fields can be directly generated without secondary development of the front end and the back end, the burden of developers is reduced, the work efficiency is improved, and the maintenance cost is reduced.

The object of the present disclosure is achieved through the following technical solution.

According to a first aspect of this specification, there is provided a method for visual construction of a knowledge graph system; the method includes the following steps of:

determining, by a central server, a data permission of a distributed client;

initiating, by the distributed client, a data permission request to the central server; and generating quadruple information conforming to a target data structure after the data permission request passes verification of the central server to obtain a master template of the knowledge graph system to be sent to the distributed client;

the distributed client receiving and parsing the master template of the knowledge graph system for rendering; and the distributed client receiving a natural language inputted by a user, parsing to generate an abstract syntax tree and processing a drag node behavior of the user to obtain a subtemplate of the knowledge graph system, and encrypting the subtemplate to be sent to the central server;

storing, by the central server, the encrypted subtemplate of the knowledge graph system into the database;

using, by the user, a knowledge concept and a knowledge graph depth as an input requirement when the distributed client requests for using the knowledge graph system, and sending, by the distributed client, the knowledge concept and the knowledge graph depth to the central server;

reading, by the central server, the encrypted subtemplate of the knowledge graph system from the database, decrypting and then searching the encrypted subtemplate of the knowledge graph system to obtain a tree structure knowledge graph and sending the tree structure knowledge graph to the distributed client; and parsing, by the distributed client, the tree structure knowledge graph, and rendering to generate a knowledge graph meeting the input requirement.

Further, the user registers and logs in the distributed client, and after being authorized by the central server, an identity account number is assigned for each user, and a message of successful registration and log-in is fed back to the user;

the data permission request is made by the user in the distributed client, the central server approves or rejects after receiving the data permission request, and if approved, a next step is performed; otherwise, a follow-up flow is interrupted;

the user inputs a target database address of the knowledge graph system to be constructed into the distributed client, and the distributed client sends the target database address to the central server in a mode of an HTTP request carrying user cookie; and the central server performs HTTP parsing, a user identity is confirmed through the parsed user cookie, identity and data permission verification is performed; if the verification is passed, a next step is performed; otherwise, the request is rejected.

Further, the central server generates quadruple information $(\varphi, \varepsilon, \zeta, \eta)$ conforming to a target data structure to obtain a master template of the knowledge graph system, where $\varphi, \varepsilon, \zeta, \eta$ represent a root node name, a node id, an original child node set and a recommended child node set respectively, which specifically includes the following steps:

the central server traversing a tree structured database corresponding to a target database address and calculating to obtain a number of child nodes of each root node, and marking the number of the child nodes of the root node n as f(n); meanwhile, recording a two-tuple mapping relation (n, f(n)) and establishing a two-tuple mapping relation set F corresponding to the tree structured database;

arranging the two-tuple mapping relation (n, f(n)) in the set F in a descending order according to a size of f(n), and marking a root node in the two-tuple mapping relation ranking first as $\varphi$;

traversing child nodes of each root node in the database except for the root node $\varphi$, and if a certain traversed child node e does not belong to child nodes of the root node $\varphi$, incorporating the child node e into a child node set of the root node $\varphi$, and marking the child node set of the root node $\varphi$ after traversing ends as $\zeta$ to serve as the original child node set;

the central server using the root node $\varphi$ and the child node set $\zeta$ as an input, marking each child node i in the $\zeta$ as $\zeta(i)$, crawling a number of knowledge entries corresponding to each search combination $\varphi+\zeta(i)$ on the Internet and marking as N(i); arranging the child nodes in the child node set $\zeta$ in a descending order according to the number of knowledge entries corresponding to the child nodes, and the child nodes ranking top R constituting the recommended child node set $\eta$;

defining a data structure of the master template of the knowledge graph system to obtain the master template of the knowledge graph system; and the central server sending the master template of the knowledge graph system to the distributed client through an HTTP request.

The data structure of the master template of the knowledge graph system is includes the root node name, the node id, the original child node set and the recommended child node set. A data structure of elements in the original child node set/recommended child node set is composed of a child node name, a child node id, and a relationship between the child node and the root node.

Further, the step of the distributed client receiving the natural language inputted by the user and parsing to generate the abstract syntax tree is specifically as follows:

the distributed client receives the natural language inputted by the user, and an inputted data format is defined as:

$$\text{InputModel}=[\text{nodeName}[\text{edgeName}_1[\text{edgeName}_{11}, \text{edgeName}_{12}, \ldots], \text{edgeName}_2, \ldots]]$$

where InputModel is a natural language input model, an operator [ ] represents obtaining a child node set corresponding to a certain node of the knowledge graph system, nodeName is the node name, $\text{edgeName}_i$ represents an $i^{th}$-level child node corresponding to the node, and $\text{edgeName}_{ij}$ represents a $j^{th}$-level child node corresponding to the $i^{th}$-level child node.

The natural language input model InputModel and the operator [ ] are used as a dictionary for performing character string parsing to generate the abstract syntax tree; wherein a data structure of the abstract syntax tree is composed of a root node name, a node id and a child node set, and a data structure of elements in the child node set is composed of the child node name, the node id and the child node set.

Further, the natural language input model InputModel is processed, which is specifically as follows.

Elements in the same operator [ ] are ranked in an order of sizes of ASCII codes to obtain a pre-processed natural language model InputModel'; MD5 message-digest algorithm processing is performed on the InputModel', and a processed natural language model is marked as MD5Model.

A two-tuple data set (a,b) is defined, where a and b represent the natural language model MD5Model and the abstract syntax tree respectively, and the two-tuple data set (a,b) is stored; after the natural language is inputted according to the natural language input model InputModel, calculation is performed through the MD5 message-digest algorithm to obtain the MD5Model, and the cached abstract syntax tree is read directly through the MD5Model.

Further, the step of processing a drag node behavior of the user to obtain the knowledge graph subtemplate specifically includes the following steps:

traversing all child nodes in the abstract syntax tree, and binding a mouse clicking event to each child node; marking a node radius in the knowledge graph system as R; starting a drag process, triggering, by the distributed client, the mouse clicking event of the child node; monitoring a mouse releasing event; ending dragging, and triggering, by the distributed client, the mouse releasing event; recording coordinates $(X_1, Y_1)$ of a terminal point position of release marking nodes except for the drag node as filter nodes, traversing all the filter nodes, and marking horizontal and vertical coordinates of a circle center of the filter node as $(X_i, Y_i)$; and calculating an offset ($Offset_x$, $Offset_y$) of the terminal point position and the filter node.

A filter node n_min corresponding to a minimum value of $Offset_x + Offset_y$ represents a node closest to the terminal point position of a drag node; if the filter node n_min satisfies $\max\{Offset_x, Offset_y\} \leq R$, dragging is valid this time, max represents taking a maximum value, the filter node n_min is marked as a parent node of the drag node this time, and the drag node is added into a child node set of the parent node; and otherwise, dragging is considered to be invalid this time, and the drag node returns to an original position.

Further, the step of encrypting the subtemplate of the knowledge graph system to be sent to the central server includes the following steps:

obtaining triple information according to the generated subtemplate of the knowledge graph system and marking the triple information as (p,q,l), wherein p,q,l represent a root node name, a node id and a child node set in the abstract syntax tree respectively; and encrypting, by the distributed client, the triple information, marking the encrypted triple information as (p',q',l'), and sending, by the distributed client, a cipher text (p',q',l') to the central server in a form of an HTTP request.

Further, the distributed client encrypts the triple information by using an asymmetrical encryption algorithm, which is specifically as follows.

The central server masters a private key k, and public keys $k_1, k_2, \ldots, k_N$ are generated after verification of user identity and data permission and issued to N distributed clients respectively; the private key k can decrypt a cipher text of any public key, a public key $k_i$ cannot decrypt a cipher text encrypted by $k_j$, where $i \neq j$; and (p,q,l) is decrypted and restored through the private key k during decryption.

Further, the user inputs the knowledge concept α and the knowledge graph depth θ when the distributed client requests for using the knowledge graph system, and the distributed client sends a two-tuple (α,θ) to the central server in a form of an HTTP request;

the central server reads the stored cipher text (p',q',l') from the database, the triple information (p,q,l) is decrypted and restored, the two-tuple (α,θ) is read, a search condition is set as using a as a root node and child nodes in a set l as search nodes, θ-layer recursion search is performed in the database, and the tree structure knowledge graph r is obtained and sent to the distributed client in a form of an HTTP; and the distributed client parses the tree structure knowledge graph r and renders to generate the knowledge graph meeting the input requirement.

According to a second aspect of the present disclosure, provided is an apparatus for visual construction of a knowledge graph system for implementing the method; the apparatus includes a user permission module, a knowledge graph model module and a UI module;

the user permission module is configured to manage user registration, log-in and permission control; wherein a user obtains an identity token through registration and log-in and then applies for a data permission of a related database from a central server; the central server performs verification after receiving a permission application, and if passing the verification, a distributed client obtains an indirect partial read permission of a target database;

the knowledge graph model module is configured to determine a master template of the knowledge graph system, a subtemplate of the knowledge graph system and a display form of a knowledge graph, and comprises a data processing module, a web crawler module, a natural language processing module, a knowledge graph system subtemplate generation module and an encryption module;

the data processing module and the web crawler module are configured to generate quadruple information conforming to a target data structure to obtain the master template of the knowledge graph system;

the natural language processing module is configured to receive a natural language inputted by the user and parse to generate an abstract syntax tree;

the knowledge graph system subtemplate generation module is configured to generate the subtemplate of the knowledge graph system in combination with the natural language processing module and the UI module; and the encryption module is configured to encrypt the subtemplate of the knowledge graph system and send a cipher text to the central server; and the UI module is responsible for functions on a UI presentation level of the distributed client and comprises a visual drag operation module and a knowledge graph rendering module;

the visual drag operation module is configured to list the quadruple information obtained by calculation through the knowledge graph model module onto a page of the distributed client, monitor and process a drag behavior for a child node by the distributed client, and add the dragged child node into a child node set of a corresponding parent node or make the dragged child node return to an original position by judging validity of the drag behavior; and render a child node generated directly after natural language processing operation to be connected onto the corresponding parent node; and the knowledge graph rendering module is configured to render a tree structure of the abstract syntax tree to generate a visual knowledge graph.

The present disclosure has the beneficial effects that:

1. The method for visual construction of a knowledge graph system proposed by the present disclosure can meet the requirements of developing own knowledge graph system in different scientific research fields, and the target knowledge graph system can be built by researchers themselves without the intervention and secondary development of front-end and back-end development engineers, thus greatly saving the development cost and improving the research efficiency.

2. With regard to the concept of knowledge graph system master template, the central server generates quadruple information that conforms to the target data structure through corresponding algorithms, and obtains the knowledge graph system master template. The knowledge graph system master template not only contains all the child nodes in the knowledge graph, but also obtains the recommended child nodes through the crawler algorithm, which is convenient for researchers to quickly screen out common semantics among many semantics.

3. For the concept of knowledge graph system subtemplate, distributed clients generate abstract syntax tree by parsing natural language, and then modify the abstract syntax tree by visual drag and drop operation, thus determining the knowledge graph system subtemplate, reducing the work of data cleaning and semantic manual screening. In addition, by way of encrypted storage, the efficiency of drawing knowledge graph by using this knowledge graph system next time is greatly improved under the condition of ensuring data security.

BRIEF DESCRIPTION OF DRAWINGS

In order to explain the embodiments of the present disclosure or the technical solution in the prior art more clearly, the drawings needed in the embodiments will be briefly introduced below. Obviously, the drawings described below are only some embodiments of the present disclosure, and other drawings can be obtained according to these drawings without creative work for those skilled in the art.

DESCRIPTION OF EMBODIMENTS

In order to better understand the technical solution of the application, the embodiments of the application will be described in detail with the attached drawings.

It should be clear that the described embodiment is only a part of the embodiment of this application, not the whole embodiment. Based on the embodiments in this application, all other embodiments obtained by ordinary technicians in this field without creative work belong to the protection scope of this application.

The terminology used in the examples of this application is for the purpose of describing specific embodiments only and is not intended to limit this application. The singular forms "a", "the" and "the" used in the embodiments of this application and the appended claims are also intended to include the plural forms, unless the context clearly indicates other meaning.

In this application, a knowledge graph is called knowledge domain visualization or knowledge domain mapping map in the library and information science, which is a series of different graphs showing the relationship between knowledge development process and structure. Knowledge resources and their carriers are described by visualization technology, and knowledge and their interrelationships are mined, analyzed, constructed, drawn and displayed. A knowledge graph system refers to the representation form of knowledge graph in specific scientific research, which can calculate and display its corresponding knowledge graph network structure diagram by searching the concept of entity. A node refers to an entity or a concept in the knowledge graph. An edge refers to various semantic relationships between entities/concepts in the knowledge graph. Back-end: that is, back-end development engineer, which refers to the staff who directly operate the database and process data in the process of network system development. Front-end: that is, the front-end development engineer, which refers to the staff who directly operate the UI layer and render the entity in the process of network system development. AST: abstract syntax tree (AST) is a tree-like representation of the abstract syntax structure of source codes, each node in the tree represents a structure in the source code, and the abstract representation transforms the front-end code into a data structure.

The present disclosure aims at generating a knowledge graph system subtemplate meeting the research requirements on the premise of ensuring the absolute safety of original data, based on knowledge graph related technology and front-end visualization drag technology, combined with the support of data security and privacy protection such as authority control and encryption algorithm, so as to provide a complete set of method and apparatus for visual construction of a knowledge graph system, thereby reducing the repeated development of back-end developers at the data level and front-end developers at the UI level and improving work efficiency and reduce maintenance cost.

Figure 1:
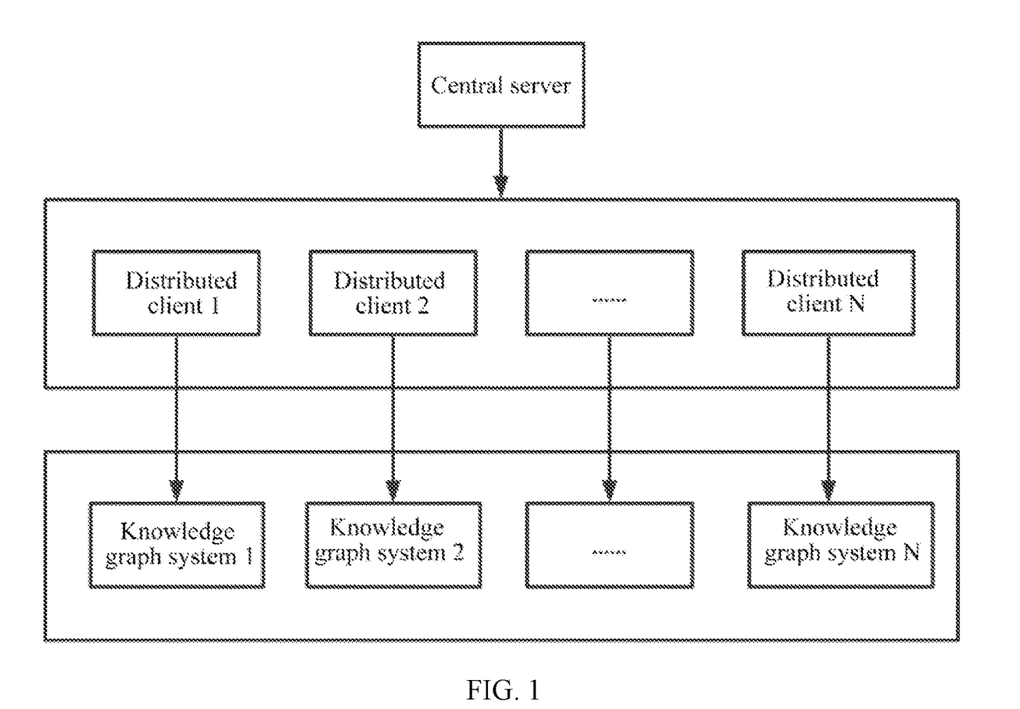
FIG. 1 is a schematic diagram of a network architecture provided by an exemplary embodiment.

The present disclosure involves two identities of a central server and distributed clients to form a 1-to-N network architecture model, as shown in FIG. 1. Each distributed client is independent of each other, and the absolute isolation of data is realized through permission control. Among them, the central server has the highest authority. After processing of data, a subtemplate of the knowledge graph system is formed and sent to the distributed clients, which obtain the reading authority of the business data, thus realizing the security and privacy guarantee of the data.

Figure 2:
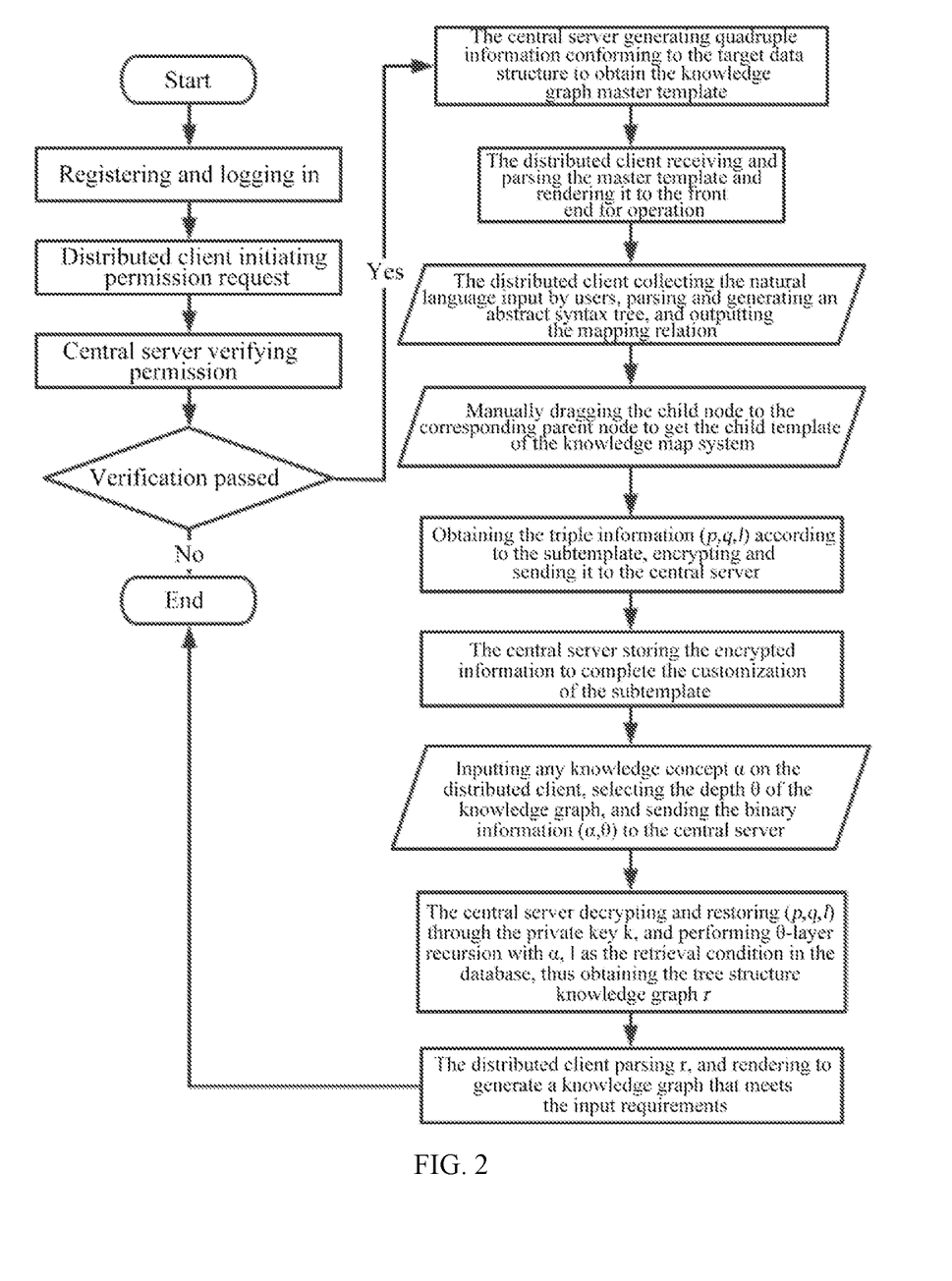
FIG. 2 is a flowchart of a method for visual construction of a knowledge graph system provided by an exemplary embodiment.

An embodiment of the present disclosure provides a method for visual construction of a knowledge graph system, as shown in FIG. 2, which includes the following steps:

Step (1), the user (e.g., researchers) registers and logs in the distributed client, and after being authorized by the central server, an identity account number is assigned for each user, and a message of successful registration and log-in is fed back to the user;

Step (2), the data permission request is made by the user in the distributed client, the central server approves or rejects after receiving the data permission request, and if approved, a next step is performed; otherwise, a follow-up flow is interrupted;

Step (3), the user inputs a target database address of the knowledge graph system to be constructed into the distributed client, and the distributed client sends the target database address to the central server in a mode of an HTTP request carrying user cookie; and Step (4), the central server performs HTTP parsing; specifically, a user identity is confirmed through the parsed user cookie, identity and data permission verification is performed; if the verification is passed, a next step is performed; the central server has the highest authority, which desensitizes the data and sends it to the distributed client, and the distributed client obtains the reading authority of the business data; if the verification is not passed, the request is rejected to ensure the confidentiality of the data; and Step (5), the central server generates quadruple information ($\varphi$, $\varepsilon$, $\zeta$, $\eta$) conforming to the target data structure through the calculation method of the knowledge graph system master template, and obtains the knowledge graph system master template, and sends the knowledge graph system master template to the distributed clients with an HTTP request; $\varphi,\varepsilon,\zeta,\eta$ represent a root node name, a node id, an original child node set and a recommended child node set, respectively, the Step (5) is specifically as follows:

Firstly, the central server traverses the tree-structured database corresponding to the target database address (if the original database is not a tree-structured database, it will be converted into a tree-structured database for subsequent processing), and the number of child nodes of each root node is calculated, including intermediate nodes and leaf nodes, and the number of child nodes of root node n is recorded as f(n); meanwhile the two-tuple mapping relation (n, f(n)) is recorded, and the two-tuple mapping relation set F corresponding to the tree-structured database is constructed.

Furthermore, the two-tuple mapping relations (n, f(n)) in the set F are arranged in a descending order according to the size of f(n). In order to improve the calculation efficiency, and when the sample size is known to be large, a stable merge sorting algorithm is adopted for descending sorting, and the time complexity is: O(n log n). The root node in the two-tuple mapping relation with the first ranking is recorded as $\varphi$, that is, the root node $\varphi$ is the root node with the largest number of child nodes.

Further, after the root node $\varphi$ is obtained, the child nodes of each root node except the root node $\varphi$ in the database are traversed. If a traversed child node e does not belong to the child node of the root node $\varphi$, the child node e is merged into the child node set of the root node $\varphi$, and the child node set of the root node $\varphi$ after the traversal is recorded as $\zeta$ as the original child node set.

Further, the central server takes root node $\varphi$ and child node set $\zeta$ as inputs, records each child node i in $\zeta$ as $\zeta(i)$, crawls the number of knowledge items corresponding to each retrieval combination $\varphi+\zeta(i)$ from the Internet, records it as N(i), and arranges the child nodes in the child node set $\zeta$ in a descending order according to the number of knowledge items corresponding to the child nodes. The child nodes ranking top R are arranged to form a recommended child node set $\eta$, and R is set to 10 in this embodiment.

Further, the data structure of the knowledge graphp system master template is defined, as shown in Table 1 and Table 2, and the targetModel of the knowledge graph system master template is obtained.

TABLE 1

Constructing information table of targetModel data structure

| Label | Description | Type | Description of Type |
|---|---|---|---|
| $\varphi$ | Root node name | Char | Character string |
| $\varepsilon$ | Node id | Long | Long number |
| $\zeta$ | Original child node set | Edges | User-defined type |
| $\eta$ | Recommended child node set | Edges | User-defined type |

TABLE 2

Constitutes information table of user-defined type edges

| Label | Description | Type | Description of type |
|---|---|---|---|
| edgeName | Child node name | Char | Character string |
| id | Node id | Long | Long number |
| relation | Relation of child node and root node | Char | Character string | targetModel, the master template of the knowledge graph system, consists of a root node name, a node id, an original child node set and a recommended child node set. The data structure of the elements in the child node set is defined as consisting of the child node name, the child node id and the relation between the child node and the root node.

According to the above steps, the targetModel, the master template of the knowledge graph system, is the quadruple information ($\varphi$, $\varepsilon$, $\zeta$, $\eta$).

Further, the targetModel, the master template of the knowledge graph system calculated above, is sent to the distributed client through an HTTP request.

Step (6), the distributed client receives the HTTP response, parses to obtain the master template of the knowledge graph system, and extracts the corresponding original child node set $\zeta$ and recommended child node set $\eta$. The recommended child node set can facilitate users (researchers) to quickly select the child nodes that may be needed.

Step (7), the distributed client receives the natural language input by the user, parses and generates the abstract syntax tree AST, and outputs the natural language –AST mapping relation. The preliminary customization of the subtemplate of the knowledge graph system is completed. The concrete steps are as follows:

First, the distributed client receives the natural language input by the user, and defines the input data format as:

InputModel=【 nodeName【 edgeName$_1$
　　【 edgeName$_{11}$,edgeName$_{12}$, ... 】,
　　edgeName$_2$, ... 】】 where InputModel is a natural language input model, an operator 【 】 represents obtaining a child node set corresponding to a certain node of the knowledge graph system, nodeName is the node name, edgeName$_i$ represents an $i^{th}$-level child node corresponding to the node, and edgeName$_{ij}$ represents a $j^{th}$-level child node corresponding to the $i^{th}$-level child node. The following is an example;

where InputModel is a natural language input model, an operator 【 】 represents obtaining a child node set corresponding to a certain node of the knowledge graph system, nodeName is the node name, edgeName$_i$ represents an $i^{th}$-level child node corresponding to the node, and edgeName$_{ij}$ represents a $j^{th}$-level child node corresponding to the $i^{th}$-level child node. The following is an example.

Taking the knowledge graph system in the field of pharmacy as an example, penicillin is selected as the root node nodeName. Then [penicillin [specification component [dosage, molecular formula], molecular formula, related clinical findings [indications, contraindications]] is used as a natural language input template. The corresponding meaning is that penicillin is taken as the root node, and specification components, molecular formulas and related clinical findings are selected as the first-level child nodes. Among them, the child nodes corresponding to specification components can be further expanded into second-level child nodes including dosage and molecular formula, and the child nodes corresponding to related clinical findings can be further expanded into second-level child nodes including indications and contraindications.

Furthermore, the natural language input template InputModel is processed. Firstly, the elements in the same operator "【 】" are sorted by the size order of ASCII codes, and the preprocessed natural language template InputModel' is obtained. The InputModel' is processed by a MD5 information summarization algorithm, and the processed natural language template is recorded as MD5Model. Using InputModel and the operator 【 】 as dictionaries, the string is parsed and the abstract syntax tree AST is generated. Then the data structure of AST is shown in Table 3 and Table 4.

TABLE 3

Constructing information table of AST data structure

| Label | Description | Type | Description of type |
|---|---|---|---|
| nodeName | Root node name | Char | Character string |
| id | Node id | Long | Long number |
| children | child node set | Children | Self-defined type |

TABLE 4

Constructing information table of user-defined type Children

| Label | Description | Type | Description of type |
|---|---|---|---|
| edgeName | Child node name | Char | Character string |
| id | Node id | Long | Long number |
| children | Child node set | Children | Self-defined type |

For example, the penicillin in the above embodiment is still taken as the root node, and the AST obtained is shown in Table 5.

TABLE 5

AST data information table with penicillin as the root node

| nodeName | id | edgeName | id | children | | |
|---|---|---|---|---|---|---|
| | | | | edgeName | id | children |
| Penicillin | 1 | Specification component | 2 | Dosage | 7 | \ |
| | | Molecular formula | 3 | Molecular formula | 3 | \ |
| | | | | | | \ |
| | | Related clinical findings | 4 | Indication | 5 | \ |
| | | | | Contraindication | 5 | \ |

Further, a binary data set (a,b) is defined, where a and b respectively represent the calculated MD5Model and AST, and the binary data set is stored. In this way, when natural language input templates with different input sequences and the same structure are input, the MD5Model obtained after calculation by MD5 information summarization algorithm is the same, and the cached AST can be directly read without repeated calculation, thus reducing time consumption.

Finally, the child nodes in AST are directly rendered and connected to the corresponding parent nodes to complete the preliminary customization of the subtemplate of the knowledge graph system.

Figure 3:
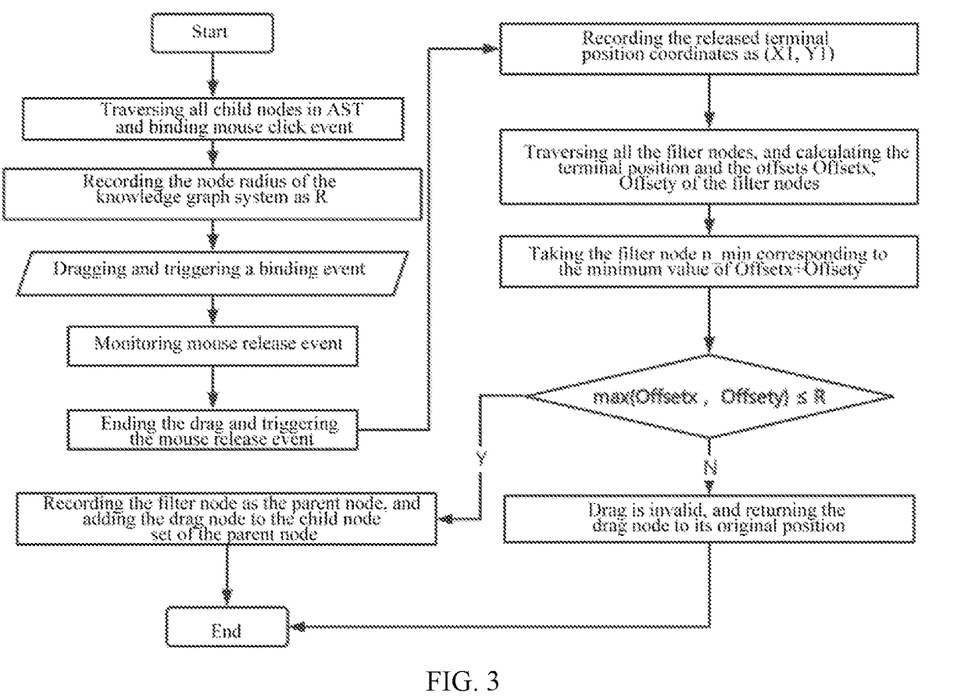
FIG. 3 is a flowchart of a visual drag operation provided by an exemplary embodiment.

Step (8), according to the research requirements, the subtemplate of knowledge graph system can be further adjusted. Users (researchers) drag and drop the child nodes to the corresponding parent nodes manually to complete further modification, and get the subtemplate model of the knowledge graph system. The design technical details are as follows:

First, all the child nodes in AST are traversed, and the mouse click event onMouseDown handler is bound to each child node.

Further, the node radius in the knowledge graph system is denoted as R.

Further, the drag-and-drop process is started, and the distributed client triggers the mouse click event onMouseDown handler of the child node.

Further, the mouse release event onMouseUp handler is monitored.

Further, the drag is ended, and the distributed client triggers the mouse release event onMouseUp handler.

Further, the released terminal position coordinates $(X_1, Y_1)$ are recorded.

Further, the nodes except the dragging nodes are recorded as filter nodes, and all the filter nodes are traversed, and the vertical and horizontal coordinates of the center of the filter nodes are recorded as $(X_1, Y_1)$.

Further, the offset $(Offset_x, Offset_y)$ between the terminal position and the filter node is calculated, and the calculation formula is: $Offset_x=|X_1-X_i|$, $Offset_y=|Y_1-Y_i|$.

Further, the filter node n_min corresponding to the minimum value of $Offset_x+Offset_y$ represents the node closest to the end point of the dragged node. If the filter node n_min satisfies $\max\{Offset_x, Offset_y\} \leq R$, the drag is valid, where max represents the maximum value, and the filter node n_min is recorded as the parent node of the dragged node, and the dragged node is added to the child node set of the parent node. Otherwise, it is considered that this drag is invalid, and the drag node is returned to its original position.

The flow of visual drag operation is shown in FIG. 3.

Step (9), according to the subtemplate model of the knowledge graph system generated in Step (8), triple information is obtained, which is recorded as (p,q,l), where p,q,l respectively represent the root node name nodeName, the node id and child node set children in AST. The distributed client can encrypt triplet information by an asymmetric encryption algorithm. The central server grasps the private key k, and after verifying the user's identity and data authority, it generates public keys $k_1, k_2, \ldots, k_N$ and sends them to N distributed clients respectively. There are N distributed clients, and N public keys are generated for the n distributed clients. According to the principle of asymmetric encryption, the private key k can decrypt the ciphertext of any public key $k_i$, while the public key $k_i$ cannot decrypt the ciphertext ($i \neq j$) encrypted by $k_j$, thus ensuring the data security of triple information (p,q,l). The encrypted triple information is recorded as (p',q',l'), and the encrypted knowledge graph system subtemplate is recorded as model'. The distributed client sends the ciphertext (p',q',l') to the central server in the form of an HTTP request.

Step (10), the central server receives the HTTP request of Step (9) and stores (p',q',l') in the database for use by the knowledge graph system, thus completing the customization of the subtemplate of the knowledge graph system.

Step (11), when the user requests to use the knowledge graph system on the distributed client, he inputs any knowledge concept, namely the root node a, selects the depth θ of the knowledge graph, and the distributed client transmits the two-tuple (α, θ) to the central server in the form of an HTTP request.

For example: input (metformin, 3), which means that it is necessary to generate a three-layer knowledge graph with metformin as the root node and conforming to the subtemplate structure of the knowledge graph system obtained in Step (10).

Step (12), the central server reads (p',q',l') stored in Step (10) from the database, and decrypts and restores (p,q,l) through the private key k. The two-tuple (α, θ) in Step (11) is read, the retrieval condition is set as taking a as the root node and the child nodes in set l as the retrieval nodes, and θ-layer recursive retrieval is performed in the database to obtain the knowledge graph r of the final tree structure, which is sent to the distributed clients in the form of HTTP.

Figure 4:
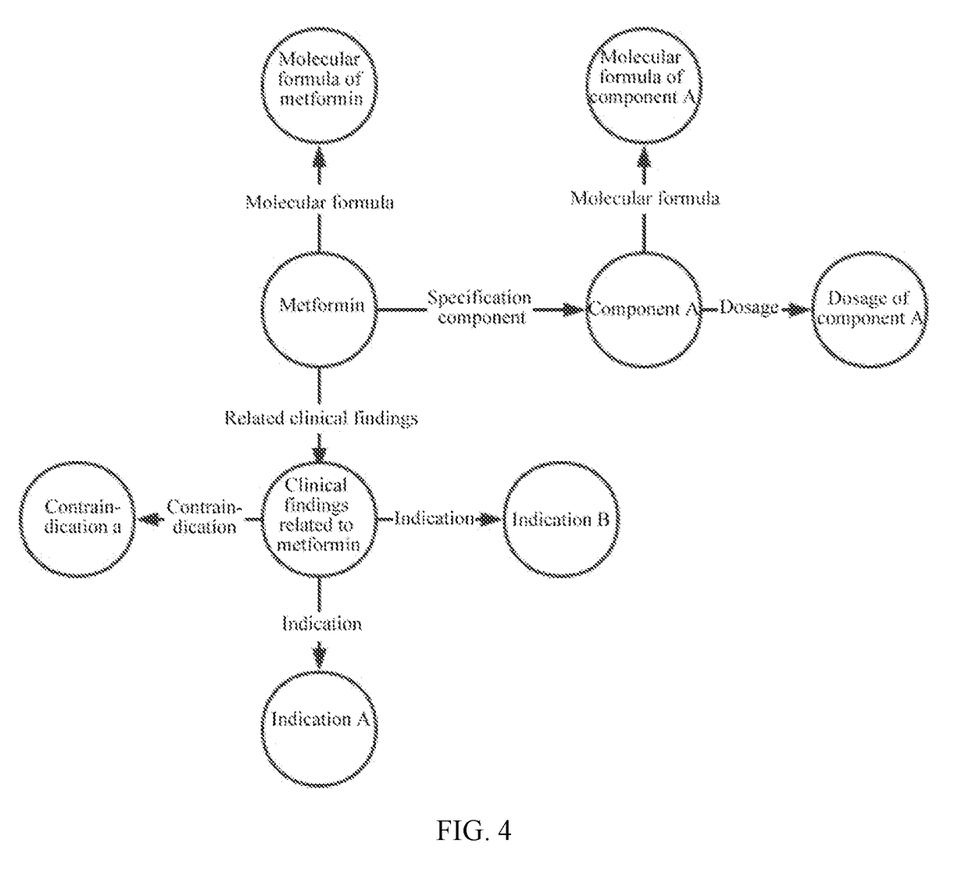
FIG. 4 is a tree structure diagram of an example knowledge graph of metformin.

For example, taking the input (metformin, 3) in Step (11) as an example, and tading (p,q,l) trained in the knowledge graph system of the pharmaceutical field mentioned in Step (7) as the subtemplate triplet, then the generated knowledge graph R is shown in FIG. 4.

Step (13), the distribution client parses the knowledge graph r generated in Step (12), and renders and generates the knowledge graph meeting the requirements of (α,θ) input in Step (11).

Figure 5:
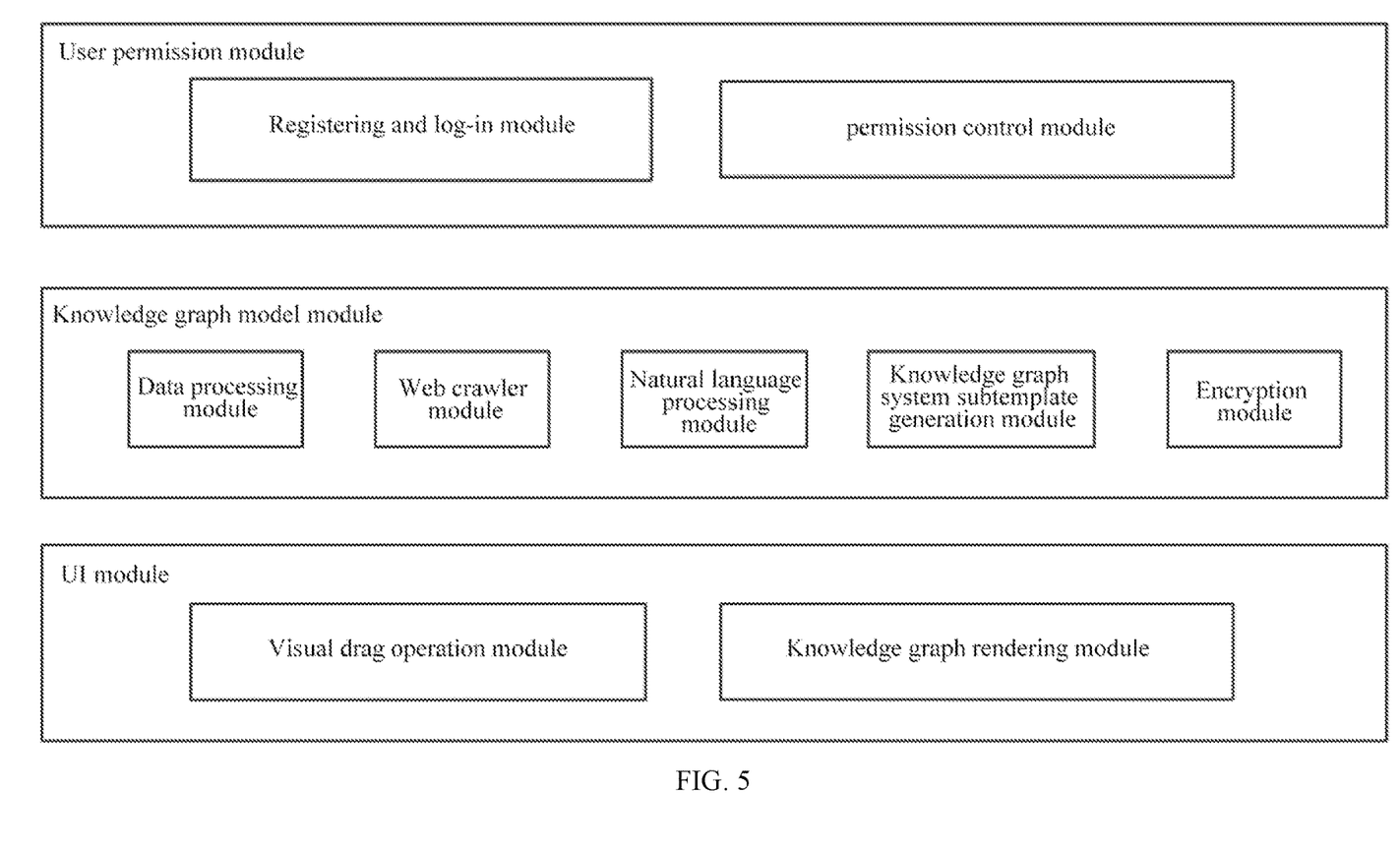
FIG. 5 is a structural diagram of an apparatus for visual construction of a knowledge graph system provided by an exemplary embodiment.

In addition, the present disclosure provides an apparatus for visual construction of a knowledge graph system, as shown in FIG. 5, which is composed of a user authority module, a knowledge graph template module and a UI module.

The user authority module is used to manage user registration, login, authority control and other functions. This apparatus is oriented to many fields that need to ensure data privacy, such as pharmaceutical knowledge graph, patient knowledge graph, clinical knowledge graph, etc. Through this module, the user's authority to the original data of the database is controlled and converged, so as to achieve the purposes of data isolation and privacy protection. This module is divided into two identities: central server and distributed clients. After the user obtains the identity token by registering and logging in, he applies to the central server for the data permission of the relevant database. After receiving the permission application, the central server will verifies it according to the fact and research. If the verification is passed, the distributed client of this station obtains the indirect partial read permission of the target database. The actual use right of the target database is still in the central server, and after data desensitization, data cleaning and other data processing by the central server, the data are sent to the distributed clients, thus ensuring the absolute privacy of the original data.

The knowledge graph template module is used to determine the master template of knowledge graph system, the subtemplate of the knowledge graph system and the display form of knowledge graph, which includes a data processing module, a web crawler module, a natural language processing module, a knowledge graph system subtemplate generation module and an encryption module.

The data processing module and the web crawler module are mainly responsible for generating quadruple information $(\varphi,\varepsilon,\zeta,\eta)$ which conforms to the target data structure, and obtaining the master template of the knowledge graph system. $\varphi, \varepsilon, \zeta, \eta$ represent the root node name, node id, original child node set and recommended child node set respectively. The calculation method of the master template of the knowledge graph system can refer to the above Step (5). The web crawler module is used to crawl the number of knowledge items corresponding to each retrieval combination $\varphi+\zeta(i)$ from the Internet.

The natural language processing module: the distributed clients receive natural language input by users, parse and generate abstract syntax tree AST, and output natural language AST mapping relation. Reference may be made to the above Step (7) for the implementation of this module.

The subtemplate generation module of the knowledge graph system is used to jointly determine and generate the subtemplate of the knowledge graph system in combination with the natural language processing module and UI module.

The encryption module is used to take triplet information (p,q,l) obtained according to the subtemplate of knowledge graph system as input, where p,q,l respectively represent the root node name, node id and child node set in AST. The distributed client encrypts the triple information through the encryption module, and asymmetric encryption algorithm can be used. The central server grasps the private key k, and after verifying the user's identity and data authority, it generates public keys $k_1, k_2, \ldots, k_N$ and sends them to N distributed clients respectively. The encrypted triple information is recorded as (p',q',l'), and the encrypted knowledge graph system subtemplate is recorded as model'. The distributed client sends the ciphertext (p',q',l') to the central server. When decrypting, (p,q,l) is decrypted and restored through the private key k.

The UI module is responsible for the functions on a UI presentation level of the distributed client and includes a visual drag operation module and a knowledge graph rendering module.

The visual drag operation module is responsible for, on one hand, listing the quadruple information $(\varphi,\varepsilon,\zeta,\eta)$ obtained by calculation through the knowledge graph model module onto a page of the distributed client, monitoring and processing a drag behavior for a child node by the distributed client, and on the other hand, adding the dragged child node into a child node set of a corresponding parent node or make the dragged child node return to an original position by judging validity of the drag behavior; in addition, the module is further responsible for rendering a child node generated directly after natural language processing operation to be connected onto the corresponding parent node. Reference may be made to the above step (8) for the implementation of this module.

The knowledge graph rendering module is responsible for rendering a tree structure of AST to generate a visual knowledge graph.

Figure 6:
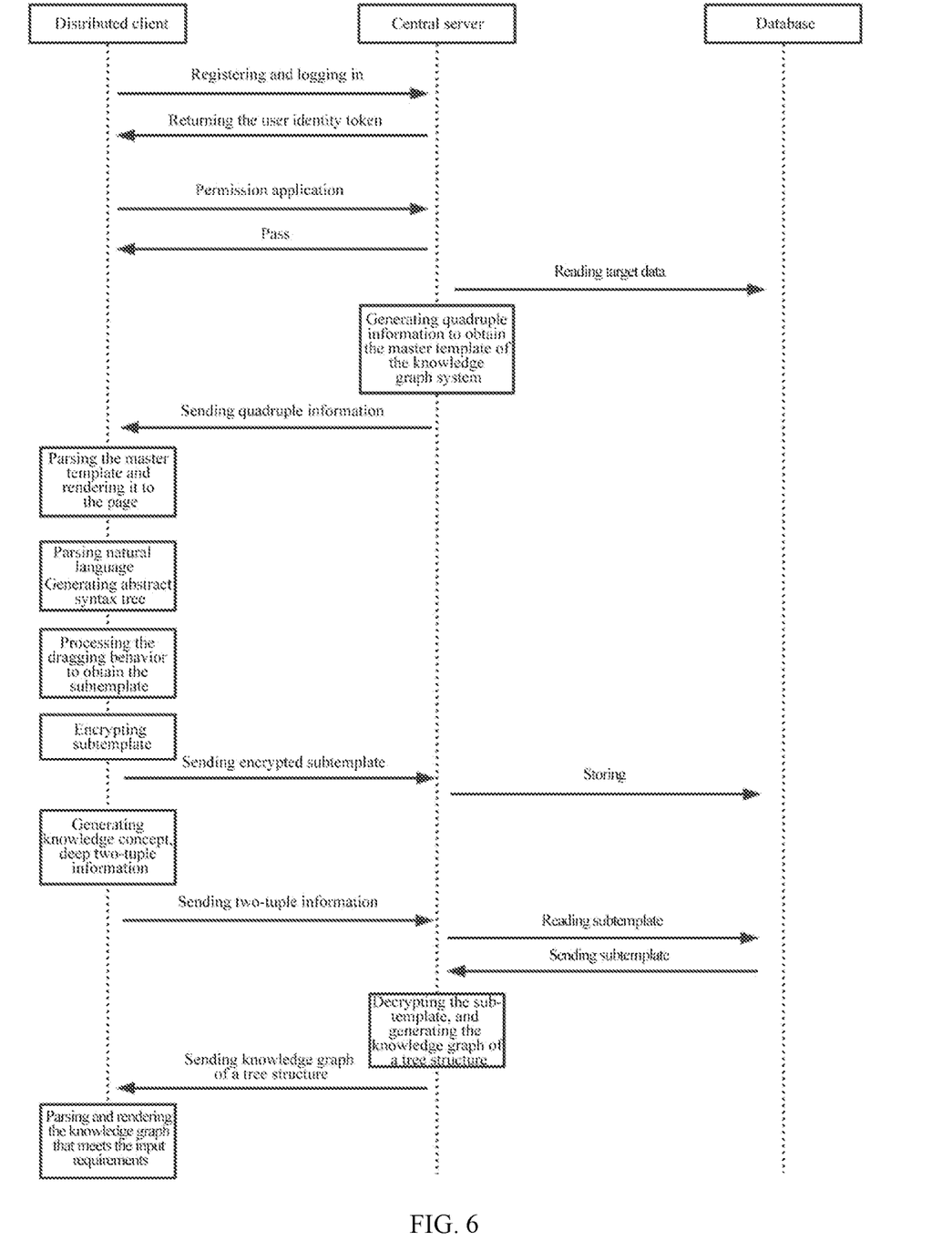
FIG. 6 is a data flow diagram of an apparatus for visual construction of a knowledge graph system provided by an exemplary embodiment.

Considering the overall performance and robustness of the apparatus, the processes with low computational requirements, such as interaction with users of knowledge graph system, rendering knowledge graph and data encryption, are undertaken by distributed clients, while the central server is responsible for the steps and modules with high performance requirements, such as searching the database, generating the master template of the knowledge graph system, crawling the web and generating the tree structure of knowledge graph. The data interaction of each process in the apparatus can be clearly seen from the data flow shown in FIG. 6.

According to the present disclosure, the data authority of the distributed clients is determined by the central server, so that data security and privacy guarantee are realized. The central serv generates that quadruple information conforming to the target data structure through the calculation method of the knowledge graph system master template, obtains the knowledge graph system master template, and send the knowledge graph system master template to the distributed clients. The distributed client receives the natural language input by the user, and parses and generates an abstract syntax tree that meets the requirements. Users can customize the subtemplate of the knowledge graph system by dragging the child nodes needed by the knowledge graph system to the corresponding parent nodes by visual operations. The distributed clients encrypt the subtemplate of the knowledge graph system and send it to the central server, and the central server stores the subtemplate. When the knowledge graph system is used, it only needs to input any knowledge concept, namely root node, and the central server will retrieve the subtemplate of the knowledge graph system. After decryption, the database will be searched according to the data format requirements, and a tree-structured knowledge graph is directly generated and sent to the distributed clients. The distributed clients parse the knowledge graph with a tree structure and renders it to generate the knowledge graph that meets the input requirements. Through this set of operations, knowledge graph systems in various research fields can be directly generated without secondary development of the front and back ends, thus reducing the burden on developers, improving work efficiency and reducing maintenance costs.

In one embodiment, a computer apparatus is proposed, which includes a memory and a processor; computer-readable instructions are stored in the memory, and when executed by the processor, the computer-readable instructions cause the processor to execute the steps in the method for visual construction of a knowledge graph system in the above embodiments.

In one embodiment, a storage medium storing computer-readable instructions is proposed, and when the computer-readable instructions are executed by one or more processors, the one or more processors are caused to execute the steps in the method for visual construction of a knowledge graph system in the above embodiments. The storage medium can be a non-volatile storage medium.

Those skilled in the art can understand that all or part of the steps in various methods of the above embodiments can be completed by instructing related hardware through a program, which can be stored in a computer-readable storage medium, which may include: Read Only Memory (ROM), Random Access Memory (RAM), magnetic disk or optical disk, etc.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

It should also be noted that the terms "including", "comprising" or any other variation thereof are intended to cover non-exclusive inclusion, so that a process, method, commodity or equipment including a series of elements includes not only those elements, but also other elements not explicitly listed, or elements inherent to such process, method, commodity or equipment. Without more restrictions, an element defined by the phrase "including a (an)" does not exclude the existence of other identical elements in the process, method, commodity or equipment including the element.

What is claimed is:

1. A method for visual construction of a knowledge graph system, comprising:
    determining, by a central server, a data permission of a distributed client;
    initiating, by the distributed client, a data permission request to the central server; and
    generating quadruple information $(\varphi,\varepsilon,\zeta,\eta)$ conforming to a target data structure after the data permission request passes verification of the central server to obtain a master template of the knowledge graph system, wherein $\varphi,\varepsilon,\zeta,\eta$ represent a root node name, a node id, an original child node set and a recommended child node set respectively, comprising:
    traversing, by the central server, a tree structured database corresponding to a target database address and calculating to obtain a number of child nodes of each root node, and marking the number of child nodes of the root node n as f(n), recording a two-tuple mapping relation (n, f(n)) and establishing a two-tuple mapping relation set F corresponding to the tree structured database;
    arranging the two-tuple mapping relation (n, f(n)) in the set F in a descending order according to a size of f(n), and marking a root node in the two-tuple mapping relation ranking first as $\varphi$;
    traversing child nodes of each root node in the tree structured database except for the root node $\varphi$, and when a certain traversed child node e does not belong to child nodes of the root node $\varphi$, incorporating the child node e into a child node set of the root node $\varphi$, and marking the child node set of the root node $\varphi$ after traversing ends as to serve as the original child node set;
    taking, by the central server, the root node $\varphi$ and the child node set $\zeta$ as an input, denoting each child node i in the child node set $\zeta$ as $\zeta(i)$, crawling a number of knowledge entries corresponding to each search combination $\varphi+\zeta(i)$ on the Internet, denoted as N(i); arranging the child nodes in the child node set $\zeta$ in a descending order according to the number of knowledge entries corresponding to the child nodes, and forming, by child nodes ranking top R, a recommended child node set $\eta$;
    defining a data structure of the master template of the knowledge graph system to obtain the master template of the knowledge graph system, wherein the data structure of the master template of the knowledge graph system comprises the root node name, the node id, the original child node set and the recommended child node set; a data structure of elements in the original child node set/recommended child node set comprises a child node name, a child node id, and a relationship between the child node and the root node;
    sending, by the central server, the master template of the knowledge graph system to the distributed client through an HTTP request;
    receiving and parsing, by the distributed client, the master template of the knowledge graph system for rendering; and
    receiving, by the distributed client, a natural language inputted by a user, parsing to generate an abstract syntax tree and processing a drag node behavior of the user to obtain a subtemplate of the knowledge graph system, encrypting the subtemplate, and sending the subtemplate to the central server;

wherein said processing a drag node behavior of the user comprises:

traversing all child nodes in the abstract syntax tree, and binding a mouse clicking event to each child node; denoting a node radius in the knowledge graph system as R; starting a drag process, triggering, by the distributed client, the mouse clicking event of the child node; monitoring a mouse releasing event; ending dragging, and triggering, by the distributed client, the mouse releasing event; recording coordinates $(X_1, Y_1)$ of a terminal point position of release marking nodes except for the drag node as filter nodes, traversing all the filter nodes, and denoting horizontal and vertical coordinates of a circle center of the filter node as $(X_i, Y_i)$;

calculating an offset $(Offset_x, Offset_y)$ of the terminal point position and the filter node, wherein a filter node n_min corresponding to a minimum value of $Offset_x + Offset_y$ represents a node closest to the terminal point position of a drag node; when the filter node n_min satisfies $\max\{Offset_x, Offset_y\} \leq R$, dragging is valid this time, max represents taking a maximum value, the filter node n_min is marked as a parent node of the drag node this time, and the drag node is added into a child node set of the parent node; and otherwise, dragging is regarded to be invalid this time, and the drag node returns to an original position;

storing, by the central server, the encrypted subtemplate of the knowledge graph system into the tree structured database;

using, by the user, a knowledge concept and a knowledge graph depth as an input requirement when the distributed client requests for using the knowledge graph system, and sending, by the distributed client, the knowledge concept and the knowledge graph depth to the central server;

reading, by the central server, the encrypted subtemplate of the knowledge graph system from the tree structured database, decrypting and searching the encrypted subtemplate of the knowledge graph system to obtain a tree structure knowledge graph and sending the tree structure knowledge graph to the distributed client; and parsing, by the distributed client, the tree structure knowledge graph, and rendering to generate a knowledge graph meeting the input requirement.

2. The method for visual construction of a knowledge graph system according to claim 1, wherein the user registers and logs in the distributed client, and after being authorized by the central server, an identity account number is assigned for each user, and a message of successful registration and log-in is fed back to the user;

wherein the data permission request is made by the user in the distributed client, the central server approves or rejects after receiving the data permission request, and when the data permission request is approved, a next step is performed; otherwise, a follow-up flow is interrupted;

wherein the user inputs a target database address of the knowledge graph system to be constructed into the distributed client, and the distributed client sends the target database address to the central server in a mode of an HTTP request carrying user cookie; and wherein the central server performs HTTP parsing, a user identity is confirmed through the parsed user cookie, identity and data permission verification is performed; when the identity and data permission verification is passed, a next step is performed; otherwise, the data permission request is rejected.

3. The method for visual construction of a knowledge graph system according to claim 1, wherein the distributed client receiving the natural language inputted by the user and parsing to generate the abstract syntax tree is as follows:

the distributed client receives the natural language inputted by the user, and an inputted data format is defined as:

InputModel=[nodeName[edgeName$_1$[edgeName$_{11}$, edgeName$_{12}$, . . . ], edgeName$_2$, . . . ]]

where InputModel is a natural language input model, an operator [ ] represents obtaining a child node set corresponding to a node of the knowledge graph system, nodeName is a node name of the node, edgeName$_i$ represents an $i^{th}$-level child node corresponding to the node, and edgeName$_{ij}$ represents a $j^{th}$-level child node corresponding to the $i^{th}$-level child node; and wherein the natural language input model InputModel and the operator [ ] are used as a dictionary for performing character string parsing to generate the abstract syntax tree; a data structure of the abstract syntax tree comprises a root node name, a node id and a child node set, and a data structure of elements in the child node set comprises the child node name, the node id and the child node set.

4. The method for visual construction of a knowledge graph system according to claim 3, wherein the natural language input model InputModel is processed as follows:

elements in a same operator [ ] are ranked in an order of sizes of ASCII codes to obtain a pre-processed natural language model InputModel'; and MD5 message-digest algorithm processing is performed on the InputModel', wherein a processed natural language model is denoted as MD5Model;

a two-tuple data set (a,b) is defined, where a and b represent the natural language model MD5Model and the abstract syntax tree, respectively, and the two-tuple data set (a,b) is stored; after the natural language is inputted according to the natural language input model InputModel, calculation is performed through the MD5 message-digest algorithm to obtain the MD5Model, and the cached abstract syntax tree is read directly through the MD5Model.

5. The method for visual construction of a knowledge graph system according to claim 1, wherein said encrypting the subtemplate of the knowledge graph system to be sent to the central server comprises:

obtaining triple information according to the generated subtemplate of the knowledge graph system and marking the triple information as (p,q,l), wherein p,q,l represent a root node name, a node id and a child node set in the abstract syntax tree respectively; and encrypting, by the distributed client, the triple information, denoting the encrypted triple information as (p',q',l'), and sending, by the distributed client, a cipher text (p',q',l') to the central server in a manner of an HTTP request.

6. The method for visual construction of a knowledge graph system according to claim 5, wherein the distributed client encrypts the triple information using an asymmetrical encryption algorithm as follows:

the central server masters a private key k, and public keys $k_1, k_2, \ldots, k_N$ are generated after verification of user identity and data permission and issued to N distributed clients, respectively; the private key k is capable of decrypting a cipher text of any public key, a public key $k_i$ is not capable of decrypting a cipher text encrypted by $k_j$, where $i \neq j$, and (p,q,l) is decrypted and restored through the private key k during decryption.

7. The method for visual construction of a knowledge graph system according to claim 5, wherein the user inputs knowledge concept α and knowledge graph depth θ when the distributed client requests for using the knowledge graph system, and the distributed client sends a two-tuple (α,θ) to the central server in a manner of an HTTP request;

wherein the central server reads the stored cipher text (p',q',l') from the tree structured database, the triple information (p,q,l) is decrypted and restored, the two-tuple (α,θ) is read, a search condition is set as using α as a root node and child nodes in a set l as search nodes, θ-layer recursion search is performed in the tree structured database, and the tree structure knowledge graph r is obtained and sent to the distributed client in a form of an HTTP; and wherein the distributed client parses the tree structure knowledge graph r and renders to generate the knowledge graph meeting the input requirement.

8. An apparatus for visual construction of a knowledge graph system for implementing the method according to claim 1, comprising:

a user permission module configured to manage user registration, log-in and permission control; wherein a user obtains an identity token through registration and log-in and applies for a data permission of a related database from a central server; the central server performs verification after receiving a permission application, and when passing the verification, a distributed client obtains an indirect partial read permission of a target database;

a knowledge graph model module configured to determine a master template of the knowledge graph system, a subtemplate of the knowledge graph system and a display form of a knowledge graph and comprising:

a data processing module and a web crawler module configured to generate quadruple information conforming to a target data structure to obtain the master template of the knowledge graph system;

a natural language processing module configured to receive a natural language inputted by the user and parse to generate an abstract syntax tree;

a knowledge graph system subtemplate generation module configured to generate the subtemplate of the knowledge graph system in combination with the natural language processing module and a UI module; and an encryption module configured to encrypt the subtemplate of the knowledge graph system and send a cipher text to the central server; and the UI module configured for functions on a UI presentation level of the distributed client and comprising:

a visual drag operation module configured to list the quadruple information obtained by calculation through the knowledge graph model module onto a page of the distributed client, monitor and process a drag behavior for a child node by the distributed client, and add the dragged child node into a child node set of a corresponding parent node or return the dragged child node to an original position by determining validity of the drag behavior; and render and connect a child node generated directly processed by the natural language onto the corresponding parent node; and a knowledge graph rendering module configured to render a tree structure of the abstract syntax tree to generate a visual knowledge graph.

* * * * *